(12) United States Patent
Zhao et al.

(10) Patent No.: US 7,969,053 B2
(45) Date of Patent: Jun. 28, 2011

(54) FLAT TYPE VIBRATION MOTOR WITH INCREASED VIBRATION AMOUNT

(75) Inventors: Kelong Zhao, Guangdong (CN); Xuezhong Wu, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 194 days.

(21) Appl. No.: 12/159,078

(22) PCT Filed: Dec. 26, 2006

(86) PCT No.: PCT/CN2006/003598
§ 371 (c)(1),
(2), (4) Date: Sep. 24, 2008

(87) PCT Pub. No.: WO2007/073688
PCT Pub. Date: Jul. 5, 2007

(65) Prior Publication Data
US 2009/0230796 A1    Sep. 17, 2009

(30) Foreign Application Priority Data

Dec. 26, 2005    (CN) .......................... 2005 1 0121330

(51) Int. Cl.
*H02K 7/065* (2006.01)
(52) U.S. Cl. ....................................................... 310/81
(58) Field of Classification Search ...................... 310/81
See application file for complete search history.

(56) References Cited

U.S. PATENT DOCUMENTS

| | | | |
|---|---|---|---|
| 6,169,348 B1 * | 1/2001 | Won | 310/81 |
| 6,359,364 B1 * | 3/2002 | Yamaguchi et al. | 310/248 |
| 6,448,677 B1 * | 9/2002 | Won | 310/81 |
| 6,507,136 B1 * | 1/2003 | Yamaguchi | 310/128 |
| 6,566,772 B2 * | 5/2003 | Yamaguchi | 310/81 |
| 6,765,331 B2 * | 7/2004 | Koyanagi et al. | 310/268 |
| 6,946,763 B1 * | 9/2005 | Park | 310/81 |
| 7,049,721 B2 * | 5/2006 | Yamaguchi et al. | 310/81 |
| 7,352,093 B2 * | 4/2008 | Kim | 310/81 |

FOREIGN PATENT DOCUMENTS

| | | |
|---|---|---|
| CN | 1206240 A | 1/1999 |
| CN | 1574555 A | 2/2005 |
| JP | 2002-10579 A | 1/2002 |
| KR | 20-0333424 | 11/2003 |

OTHER PUBLICATIONS

PCT International Search Report for PCT/CN2006/003598, mailed Mar. 8, 2007, 4 pages.

* cited by examiner

*Primary Examiner* — Burton Mullins
(74) *Attorney, Agent, or Firm* — Blakely, Sokoloff, Taylor & Zafman LLP.

(57) ABSTRACT

A flat type vibration motor with increased vibration amount comprises a vibrator (1), a hard circuit board (2), a rotor (3), a shaft (5), a lower case (9), a magnet (8), a flexible circuit board (11), a brush (10) and winding coils (a, b). The rotor (3) is formed by injection-molding the vibrator (1). The winding coils (a, b) and the hard circuit board (2) are both mounted on the vibrator (1), thus the outer edge of the vibrator (1) can be extended to the position beyond the winding coils (a, b) and the hard circuit board (2).

4 Claims, 6 Drawing Sheets

FLAT TYPE VIBRATION MOTOR WITH INCREASED VIBRATION AMOUNT

CROSS-REFERENCE TO OTHER APPLICATIONS

This is a National Phase of International Application No. PCT/CN2006/003598 filed on Dec. 26, 2006, which claims priority from Chinese Patent Application No. 200510121330.7, filed on Dec. 26, 2005.

FIELD OF INVENTION

The present invention relates to a DC permanent magnetic vibration motor applicable to communication devices such as mobile telephones and Beep Pagers (BBs), which is a flat type vibration motor that can produce vibrations to prompt or warn the user in receipt of signals in occasions that the ringing is unsuitable.

BACKGROUND OF INVENTION

The structure of a flat type vibration motor in the prior art is shown in FIGS. 1a and 1b, wherein, an eccentric vibrator 1 and winding coils a, b are bonded to a circuit board 2 with glue, and then are injection-molded with a center oil-retaining bearing 4 together to form a rotor 3; the center shaft 5 is fixed on a lower case 9, the rotor is mounted on the shaft through the bearing hole, and a magnet 8 is bonded to the lower case 9 to provide magnetic flux. A brush 10 is welded to a flexible circuit board 11, an upper case 7 covers the rotor and the lower case, and gaskets 6a, 6b are mounted on top side and bottom side of the rotor bearing respectively.

FIGS. 2a and 2b show the technical solution of a flat type vibration motor disclosed in China Patent Publication No. CN1206240A. In order to increase vibration amount, winding coils a, b, c are eccentrically mounted at one side, a piece of high-density composite engineering plastic 1 is mounted on the outer side of the eccentric rotor and protrudes from the bottom of the rotor so as to increase eccentric weight, wherein the protruding part is located in the circular space between the magnet 8 and the upper case 7. The middle part is made of a resin in density smaller than 1.8 Kg/m$^3$.

FIGS. 3a and 3b show a technical solution for increasing vibration amount that is disclosed in Korea Patent Application No. 20-0333424, wherein the eccentric vibrator 1 is moved outwards to the edge of the rotor, and is bonded together with the winding coils to a hard circuit board 2, and then the rotor and the winding coils are injection molded together with the center bearing 4.

In the first technical solution described above, in order to prevent the vibrator from releasing, the vibrator is injection molded in plastic material, which limits the increase of the size of the vibrator and the eccentric distance.

In the second technical solution described above, since the eccentric weight is provided by the composite engineering plastic, the increase of eccentric weight is limited, and the size of the magnet has to be reduced greatly due to the protruding part of the rotor; as a result, the magnetic flux provided to the motor is reduced significantly, and the motor performance will be degraded severely.

Though the third technical solution can increase the eccentric amount to a certain degree, the increase in the size of the vibrator is very limited.

All the technical solutions described above have the drawbacks in that: the vibration amount will be reduced severely as the motor size is reduced; before the motor rotor is injection molded, the winding coils and the eccentric vibrator must be fixed by bonding, thus they may displace when the rotor is injection molded if they are not fixed well.

SUMMARY OF INVENTION

The object of the present invention is to ensure that the vibration amount of a flat type vibration motor will not be reduced severely as the motor size is reduced, and simplify the motor manufacturing process and provide a flat type vibration motor with increased vibration amount.

The technical solution of the present invention is that: a flat type vibration motor with increased vibration amount, which comprises a vibrator, a hard circuit board, a rotor, a shaft arranged in the rotor to support the rotor to rotate, a lower case designed to fix the shaft, a magnet fixed to the lower case to provide magnetic force, a flexible circuit board attached to the lower case to provide power input, a brush connected between the flexible circuit board and the rotor, and winding coils; the rotor is formed by injection molding the vibrator; wherein, the winding coils and the hard circuit board are both mounted on the vibrator, such that the outer edge of the vibrator is extended to the position beyond the winding coils and the hard circuit board.

Preferably, the present invention further comprises the following features:

On one side of the vibrator has bulges designed to mount the winding coils.

On the other side of the vibrator has a mounting channel to mount the hard circuit board, wherein, the radius of the hard circuit board is smaller than the radius of the vibrator, and the hard circuit board is directly mounted in the mounting channel of the vibrator.

The vibrator is made of an alloy material in density greater than 15 Kg/m$^3$, including tungsten alloy.

The surface of the vibrator is nickel-plated, so as to increase magnetic conductibility at the center of the winding coils, and magnetic conductibility between the winding coils and the magnet.

The hard circuit board for the rotor is a double-side board, the part that contacts with the brush on the hard circuit board is made into commutators, and the radius of the circuit board is smaller than the radius from the outer edge to the center of the vibrator.

The parts of the rotor are injection-molded together finally with a hole in the center using a compound resin material in density smaller than 2 Kg/m$^3$, and the resin material is self-lubricant and wear resistant.

With the above technical solution, the winding coils and the hard circuit board are mounted to the vibrator firstly to form a special vibrator, and then the special vibrator with the winding coils and the hard circuit board is injection molded into the rotor. Since the winding coils and the hard circuit board are mounted on the vibrator, they will no longer be factors for blocking the vibrator to extend outwards, and therefore the outer edge of the vibrator can be extended to a position beyond the winding coils and the hard circuit board. To this end, the size of the vibrator can be increased while the total size of the motor is reduced, and thereby the vibration amount of the motor can be increased. In addition, the performance of the magnet and winding coils is not affected.

DETAILED DESCRIPTION OF EMBODIMENTS

Hereinafter, the present invention will be described with some embodiments, with reference to the accompanying drawings 4a-6b, wherein identical reference numbers designate identical or similar components in the accompanying drawings.

The flat type vibration motor provided in the present invention comprises an end cap assembly with a power input and transfer unit, a rotor that rotates and produces eccentric vibrations, and a stator composed of an upper case and sliding blades. The stator part comprises an upper case and sliding blades that are bonded to the center of the upper case and protrude from the circular part and are designed to reduce vibration and friction. The end cap assembly comprises a lower case, a flexible circuit board bonded to the lower case for receiving electrical power, a brush welded to the flexible circuit board, a shaft pressed into the center of the end cap, and gaskets fitted over the shaft below the rotor. The rotor part is based on a vibrator in density greater than 15 Kg/m³, and comprises winding coils fitted over the protruding part in elliptical shape of the vibrator, and plastic material used for injection molding in density smaller than 2 Kg/m³.

Figure 1A:
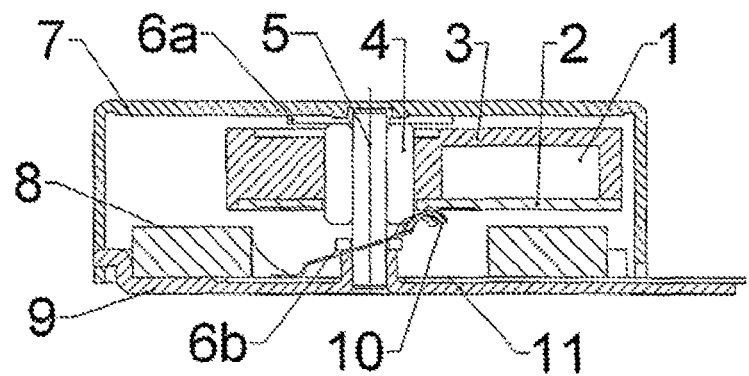
FIG. 1a is a structural diagram of a general vibration motor.
Figure 1B:
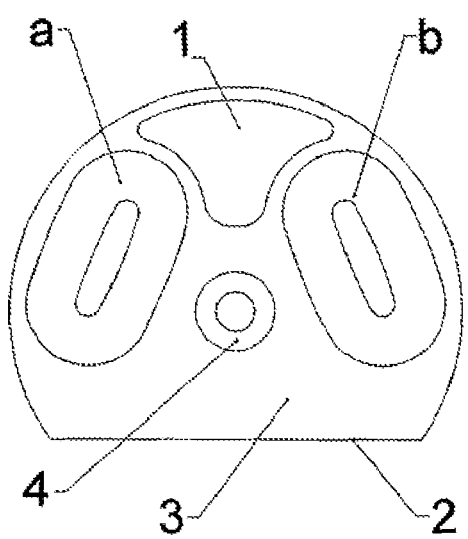
FIG. 1b is a structural diagram of the rotor of the general vibration motor.
Figure 2A:
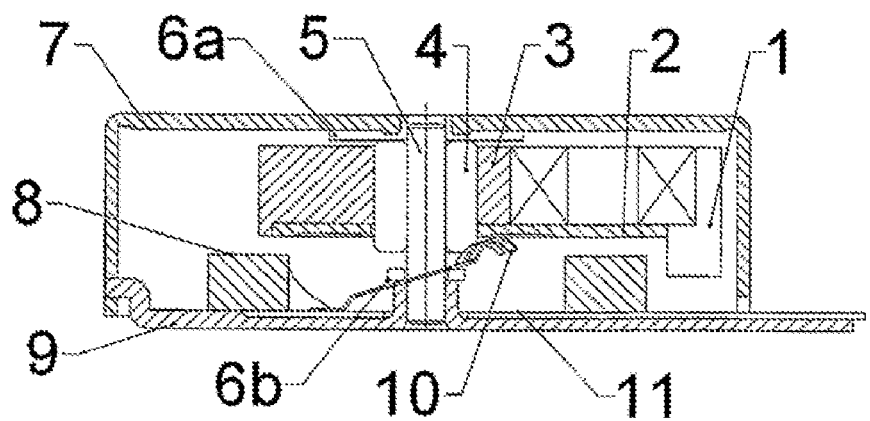
FIG. 2a is a structural diagram of the vibration motor disclosed in Chinese Patent Publication No. CN1206240A.
Figure 2B:
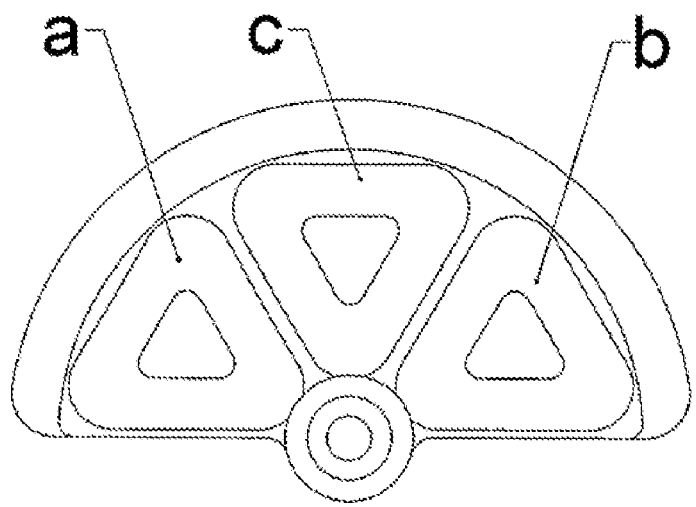
FIG. 2b is a structural diagram of the rotor of the vibration motor disclosed in Chinese Patent Publication No. CN1206240A.
Figure 3A:
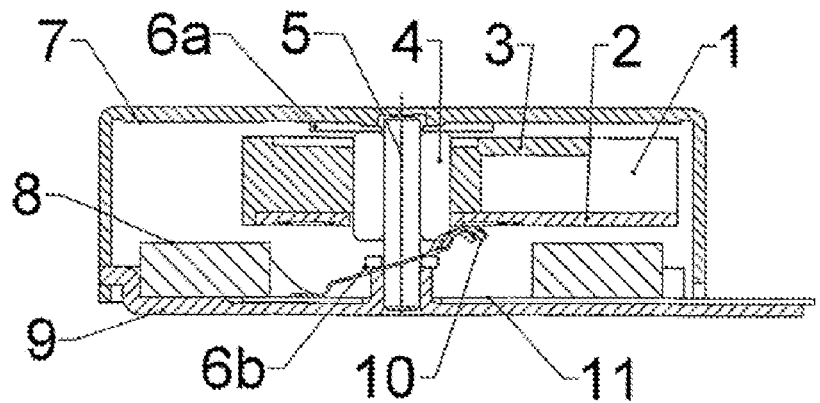
FIG. 3a is a structural diagram of the vibration motor disclosed in Korea Patent Application No. 20-0333424.
Figure 3B:
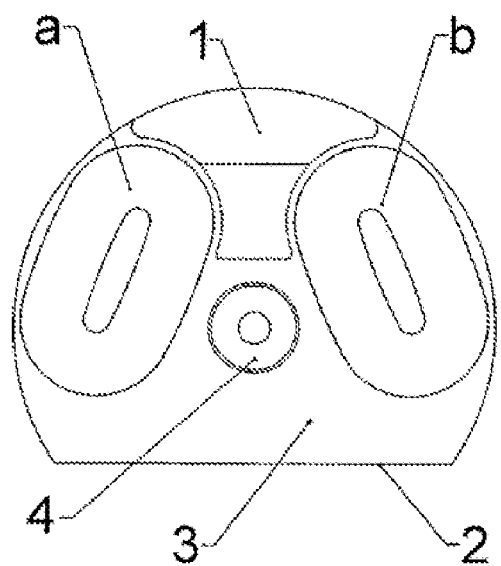
FIG. 3b is a structural diagram of the rotor of the vibration motor disclosed in Korea Patent Application No. 20-0333424.
Figure 4A:
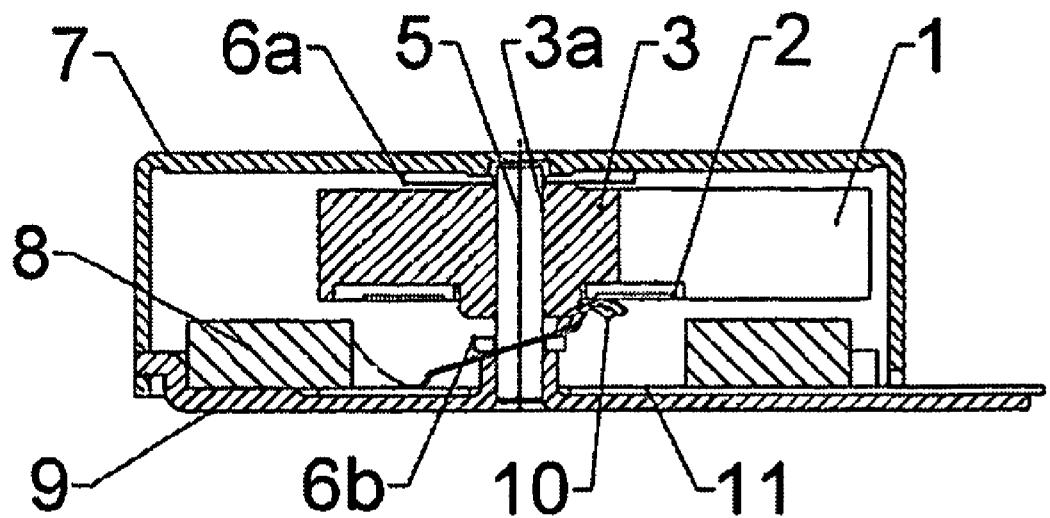
FIG. 4a is a structural diagram of the vibration motor provided in the present invention.
Figure 4B:
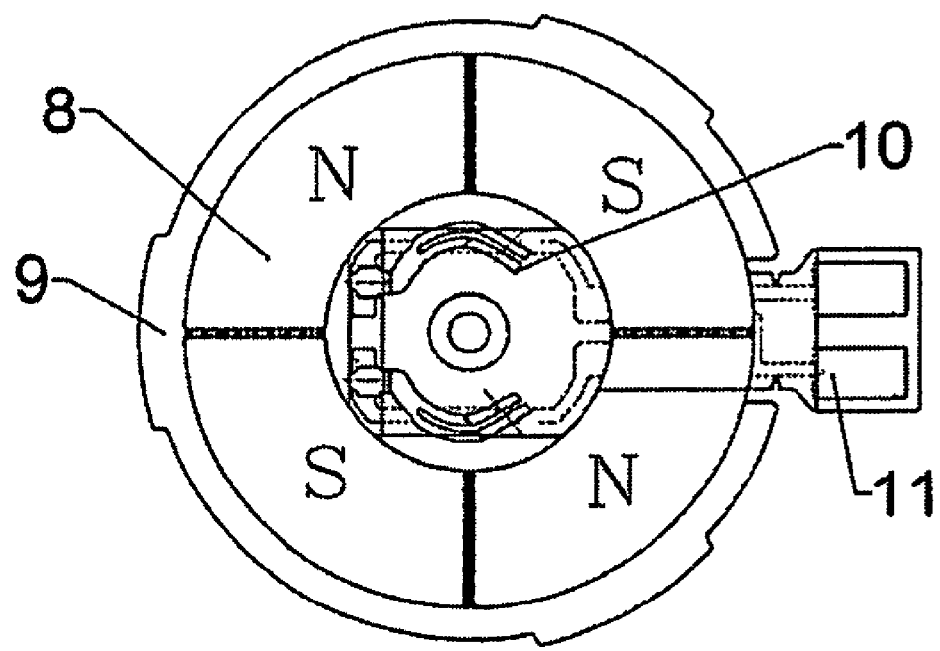
FIG. 4b is a structural diagram of the end cap assembly of the vibration motor provided in the present invention.

FIG. 4a is a structural diagram of the vibration motor provided in the present invention; FIG. 4b is a structural diagram of the end cap assembly of the vibration motor provided in the present invention.

In the flat type vibration motor with increase vibration amount in the embodiment of the present invention, the end cap assembly that provides power input and magnetic flux comprises: a lower cover 9; a flexible circuit board 11 that is bonded to the lower case with double-sided glue; a pair of brushes 10 made of a highly elastic material and welded to the flexible circuit board, electrical power is introduced to the rotor through the flexible circuit board and the brushes; and the magnet 8 with high magnetic power that is bonded to the lower case and employs planar quadrupole magnetic charging.

Figure 5A:
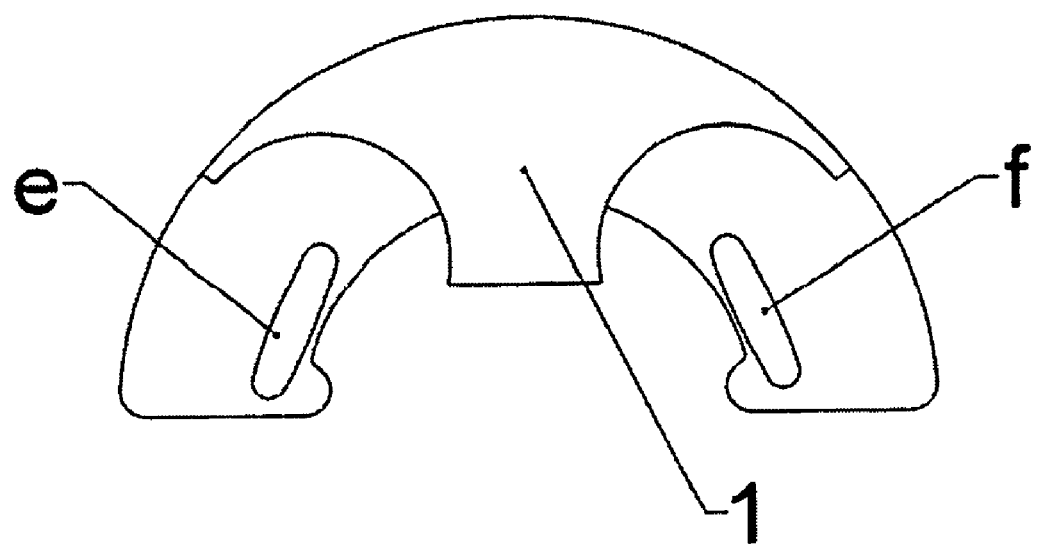
FIG. 5a is a front view of the vibrator of the vibration motor provided in the present invention.
Figure 5B:
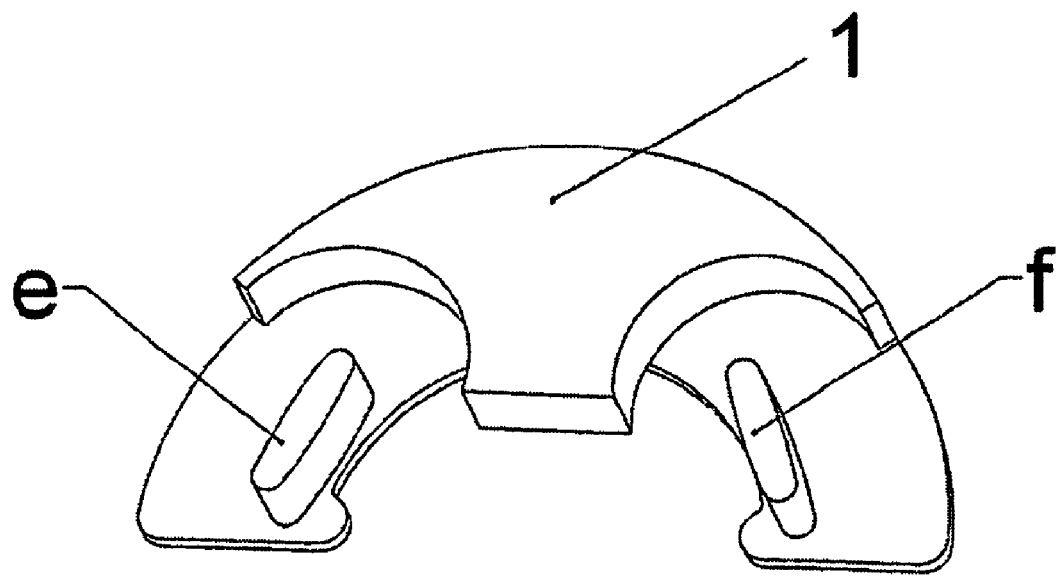
FIG. 5b is a three-dimensional view of the vibrator of the vibration motor provided in the present invention.
Figure 6A:
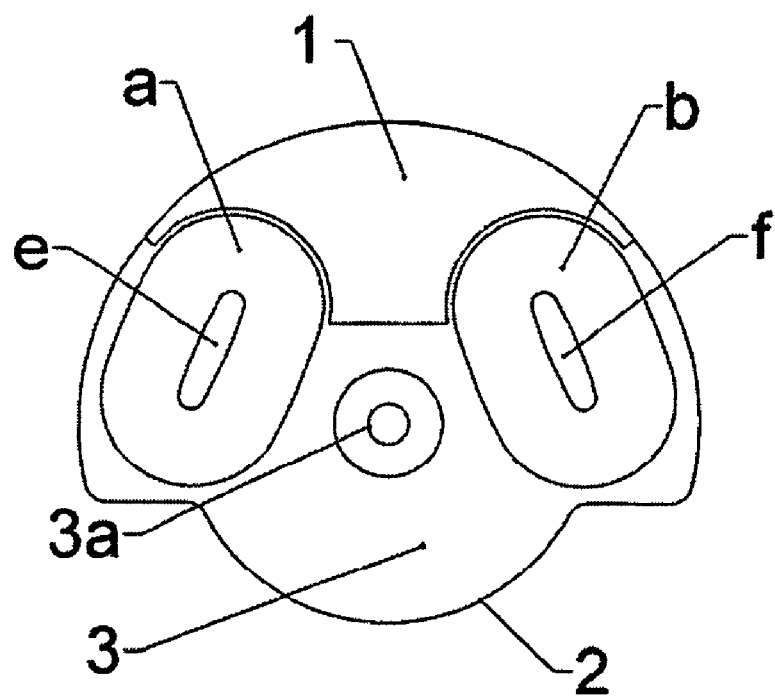
FIG. 6a is a front view of the rotor structure of the vibration motor provided in the present invention.
Figure 6B:
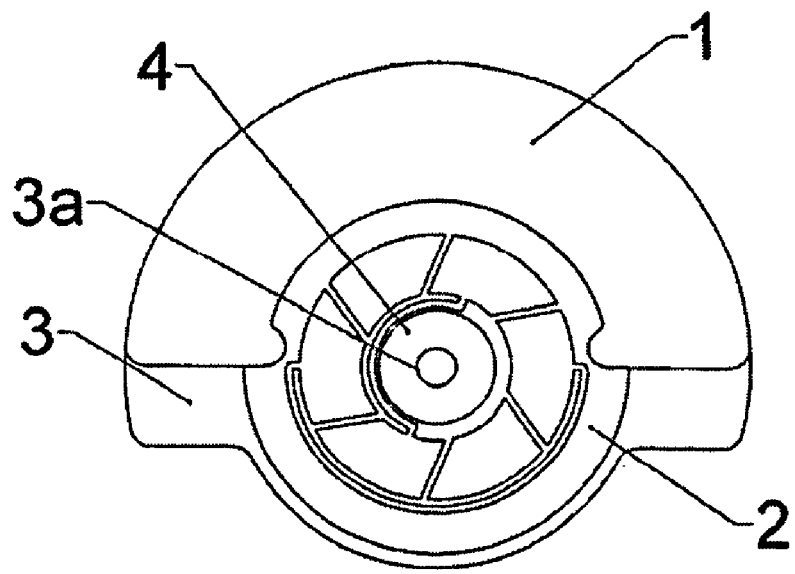
FIG. 6b is a rear view of the rotor structure of the vibration motor provided in the present invention.

The rotor part comprises a vibrator 1 shown in FIGS. 5a and 5b, wherein, the vibrator 1 has two elliptical bulges e, f fitted to the inner holes of the winding coils. As shown in FIGS. 6a and 6b, winding coils a, b are mounted at the bulges e, f of the vibrator, a hard circuit board 2 is mounted in a channel on the other side of the vibrator. The hard circuit board 2 has commutators that are irregularly distributed on the front side thereof, and solder points formed on the back side thereof and connected with the commutators, the taps of the winding coils are soldered to the solder points. The entire assembly is then injection molded using a self-lubricant and wear resistant compound resin to form the rotor, and the center hole 3a formed in injection molding is used to mount the bearing. Due to the existence of the bulges e, f, the vibrator weight is increased; moreover, the winding coil fixing trouble that hampered increasing of vibrator weight previously becomes a favorable factor for increasing the vibrator weight now. Since the plastic material is injected after the winding coils and the hard circuit board are mounted, the vibrator can be fixed well in the plastic material.

As shown in FIG. 4a, the case part comprises a gasket 6a bonded to the housing 7 with double-sided glue; after the housing is assembled with the lower case, the entire assembly is fastened together by sealing or laser welding.

When the vibration motor operates, electric current flows in the flexible circuit board 11, passes through the brush 10 to the commutators on the hard circuit board 2 and then to the winding coil a or b. The electrified winding coil produces rotating torque relative to the shaft 5 in the magnetic field provided by the magnet 8. Under the action of the commutator, the electric current in winding coil a or b varies alternatively, and thereby produces persistent rotating torque; therefore, the eccentric rotor produces vibrations as it rotates.

It can be seen from the above description, the flat type vibration motor provided in the present invention maximizes the vibrator weight and eccentricity, reduces difficulties in assembling of the motor rotor, maximizes the vibration amount of the motor, and improves manufacturing efficiency.

The present invention has the following advantages:

Since the vibrator is made of high-density tungsten alloy, the weight in unit volume is maximized;

The nickel-plating on the surface of the vibrator improves the magnetic conductibility between the winding coils and the magnet, and especially, improves the magnetic conductibility at the center of the winding coils, and therefore increases the magnetic flux through the winding coils under the same conditions.

Since the rotor is formed based on the vibrator, the vibrator can be extended outwards as far as possible and will not be blocked by the winding coils and the hard circuit board; therefore, the size of the vibrator can be increased as far as possible; the winding coils and the hard circuit board can be mounted to appropriate positions on the vibrator and then injection molded with the vibrator to form an integral rotor.

The rotor is injection molded using a compound resin material that is self-lubricant and wear resistant, and the center hole 3a formed in injection molding can be used to mounted the bearing; therefore, an oil-retaining bearing is not required. In addition, since oil filling is not required, oil will not flow to the surface of the commutators to affect the service life of the motor.

What is claimed:

1. A flat type vibration motor comprising:
   a hard circuit board,
   a rotor, wherein the rotor includes a vibrator made of an alloy material with a density greater than 15 Kg/m³ and wherein parts of the rotor are injection molded together with a hole at the center using a compound resin material with a density smaller than 2 Kg/m³, wherein the resin material is self-lubricant and wear resistant,
   a shaft arranged in the rotor to support the rotor to rotate, a lower case designed to fix the shaft, a magnet fixed on the lower case to provide magnetic force, a flexible circuit board attached to the lower case to provide power input, a brush connected between the flexible circuit board and the rotor, and winding coils, wherein the winding coils and the hard circuit board are mounted on the vibrator such that the outer edge of the vibrator is extended outwards to a position beyond the winding coils and the hard circuit board, and wherein the vibrator has bulges on one side which are designed to mount the winding coils.

2. The flat type vibration motor according to claim 1, wherein, the vibrator has a mounting channel on the other side which is designed to mount the hard circuit board, the radius of the hard circuit board is smaller than the radius of the vibrator, and the hard circuit board is directly mounted in the mounting channel of the vibrator.

3. The flat type vibration motor according to claim 1, wherein, the surface of the vibrator is nickel-plated to increase the magnetic conductibility at the center of the winding coil, and the magnetic conductibility between the winding coils and the magnet.

4. The flat type vibration motor according to claim 2, wherein, the hard circuit board for the rotor is a double-sided board, the part that contacts with the brush on the hard circuit board is made into a commutator, and the radius of the circuit board is smaller than the radius from the vibrator to the vibrator center.

* * * * *